United States Patent
Seo et al.

(10) Patent No.: US 11,042,374 B2
(45) Date of Patent: Jun. 22, 2021

(54) NON-VOLATILE DUAL IN-LINE MEMORY MODULE STORAGE

(71) Applicant: International Business Machines Corporation, Armonk, NY (US)

(72) Inventors: Carlos Eduardo Seo, Sao Paulo (BR); Juscelino Candido De Lima Junior, Campinas (BR); Breno H. Leitao, Araraquara (BR)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 16/401,358

(22) Filed: May 2, 2019

(65) Prior Publication Data
US 2020/0348935 A1 Nov. 5, 2020

(51) Int. Cl.
*G06F 9/30* (2018.01)
*G06F 12/06* (2006.01)

(52) U.S. Cl.
CPC ...... *G06F 9/30043* (2013.01); *G06F 12/0646* (2013.01); *G06F 2212/1008* (2013.01)

(58) Field of Classification Search
None
See application file for complete search history.

(56) References Cited

U.S. PATENT DOCUMENTS

| 5,535,355 A * | 7/1996 | Scales ............ G06F 11/1417 703/25 |
| 9,886,194 B2 | 2/2018 | Zheng et al. |
| 9,946,610 B2 | 4/2018 | Kinoshita |
| 2017/0017402 A1 | 1/2017 | Zheng et al. |
| 2017/0371555 A1 * | 12/2017 | Lee ............ G06F 3/068 |
| 2018/0137057 A1 * | 5/2018 | Hsu ............ G06F 12/0246 |
| 2018/0246643 A1 | 8/2018 | Jenne et al. |
| 2018/0246647 A1 | 8/2018 | Sankaranarayanan et al. |
| 2019/0243575 A1 * | 8/2019 | Leyda ............ G06F 3/0619 |

OTHER PUBLICATIONS

Wikipedia, "Instruction set architecture", From Wikipedia, the free encyclopedia, last edited on Mar. 8, 2019, printed Mar. 18, 2019, 10 pages, https://en.wikipedia.org/wiki/Instruction_set_architecture.
Unknown, "Event Based Branching Overview, ABI, and API", last edited Jan. 29, 2016, printed Mar. 18, 2019, 13 pages, https://github.com/paflib/paflib/wiki/Event-Based-Branching----Overview,-ABI,-and-API#Event_Based_Branching Overview_ABI_and_API.
Wikipedia, "Loader (computing)", From Wikipedia, the free encyclopedia, last edited on Mar. 6, 2019, printed Mar. 18, 2019, 4 pages, https://en.wikipedia.org/wiki/Loader_(computing).

* cited by examiner

*Primary Examiner* — Denise Tran
(74) *Attorney, Agent, or Firm* — Donald J. O'Brien (57) ABSTRACT

Embodiments are disclosed for managing a non-volatile dual in-line memory module (NVDIMM) storage system. The techniques include loading an executable to a volatile random access memory. The techniques also include in response to a store operation attempted by the executable, determining that a target address of the store operation is not mapped from an address in the random access memory to an address in an NVDIMM. The techniques further include mapping the target address from the address in the volatile random access memory to the address in the NVDIMM. Additionally, the techniques include performing the store operation in the address in the NVDIMM based on the mapping.

17 Claims, 6 Drawing Sheets

NON-VOLATILE DUAL IN-LINE MEMORY MODULE STORAGE

BACKGROUND

The present disclosure relates to non-volatile dual in-line memory modules, and more specifically, to non-volatile dual in-line memory module storage.

A non-volatile dual in-line memory module (NVDIMM) is a computer memory device that provides random-access memory. Random-access memory is a relatively fast form of computer memory where reads and writes can be performed at the same speed. Being non-volatile means that when electric power is lost, the NVDIMM retains the contents of its memory, whether the power loss is unexpected or due to a normal shutdown.

SUMMARY

Embodiments are disclosed for managing a non-volatile dual in-line memory module (NVDIMM) storage system. The techniques include loading an executable to a volatile random access memory. The techniques also include in response to a store operation attempted by the executable, determining that a target address of the store operation is not mapped from an address in the random access memory to an address in an NVDIMM. The techniques further include mapping the target address from the address in the volatile random access memory to the address in the NVDIMM. Additionally, the techniques include performing the store operation in the address in the NVDIMM based on the mapping.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Computer systems can include volatile memory, such as a random access memory (RAM). Volatile memory can provide the advantage of relatively fast memory accesses in comparison to non-volatile memory. Thus, the executable version of a computer program (an executable) may be loaded into RAM. Additionally, any data read or written by the computer program (dynamic program data) can be loaded to RAM. However, unlike non-volatile memory, when volatile memory loses power, the volatile memory loses the contents of the memory, too. Thus, if there is an interruption to the power supply during execution of the computer program, it may not be possible to resume execution of the computer program when power is restored. This scenario is referred to as an unrecoverable error.

To avoid unrecoverable errors resulting from an unexpected power loss, a computer system can include volatile memory and an NVDIMM having a NAND flash chip. In such a computer system, the program data can be loaded into the non-volatile memory. Additionally, store operations can be written on NVDIMM Accordingly, when power fails in such a computer system, the loader can use the address table which contains the location of the store operations to memory to re-construct the VMA with information based on disk and NVDIMM. This way, the memory contents (i.e. program data) can be retained in the event of a power loss. Thus, when power is restored, the program data can be recovered based on the address table located in the NVDIMM. Further, the loader can keep track of a program counter, which identifies the program instruction that is currently executing. Accordingly, because the program data may be retained, and the instruction that is executing when power is lost can be identified, the computer program can resume execution after a power loss. However, regarding computer memory costs, NVDIMMs are more expensive than volatile memory. Thus, using the NVDIMM to store only DATA of a program can be a cost-effective way to reduce unrecoverable errors.

Accordingly, embodiments of the present disclosure can reduce the amount of storage used in the NVDIMM by placing the executable in volatile memory and placing dynamic program data in the NVDIMM. Thus, instead of loading dynamic program data to volatile memory, where the data may be lost in the event of a power loss, the dynamic program data can be retained if power is lost because the dynamic program data is stored in non-volatile memory.

Figure 1:
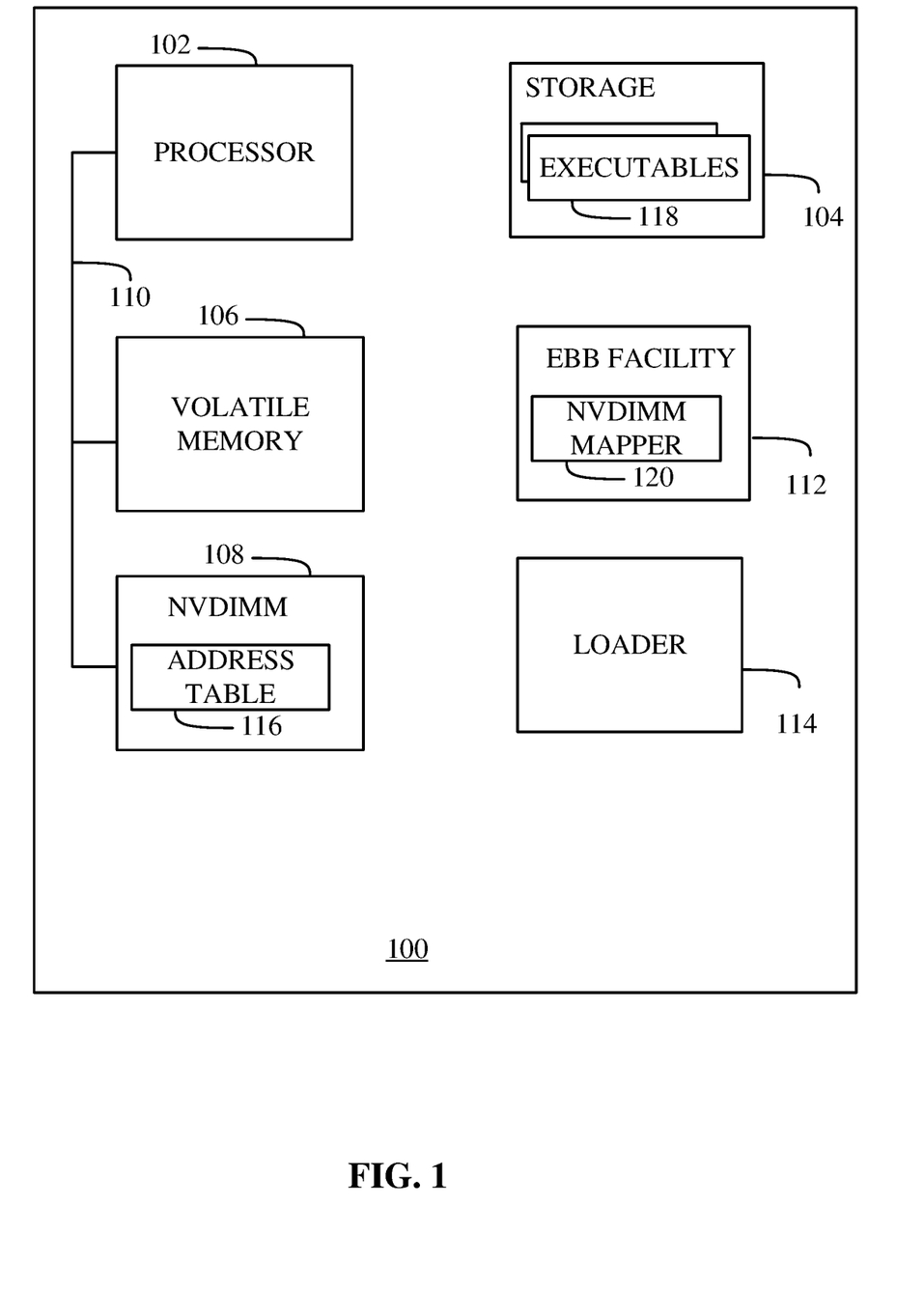
FIG. 1 illustrates a block diagram of an example system for non-volatile dual in-line memory module (NVDIMM) storage, in accordance with embodiments of the present disclosure.

Referring now to FIG. 1, illustrated is a block diagram of an example system 100 for NVDIMM storage, in accordance with embodiments of the present disclosure. The system 100 can be any computing device, such as, a server, desktop, laptop, tablet, or mobile computing device. The system 100 includes a processor 102, storage 104, volatile memory 106, NVDIMM 108, memory channel 110, event-based branching (EBB) facility 112, and loader 114.

The processor 102 can be electronic circuitry within a computer that executes the instructions of a computer program by performing the arithmetic, logical, and other operations specified by the instructions. The processor 102 can also be referred to as a microprocessor, computer processing circuit, central processing unit (CPU), and the like.

The storage 104 can be a computer memory that is used for mass storage. Example devices for storage 104 can include hard disk drives, solid state drives, flash drives, and the like. The storage 104 can include executables 118. The executables 118 can be executable versions of computer programs that are configured to run on the processor 102.

The memory channel 110 can be a bus that connects the volatile memory 106 and NVDIMM 108 to the processor. The memory channel can be the fastest bus of the system 100.

The volatile memory 106 can be a computer memory device that retains its contents while the power supply to the volatile memory 106 is maintained. Examples of volatile memory 106 include dynamic RAM, static RAM, and the like. As stated previously, volatile memory 106 loses its memory contents when power is interrupted or lost.

In contrast, the NVDIMM 108 is a computer memory device that provides non-volatile RAM. In this way, the NVDIMM 108 can provide relatively fast memory access without the risk of losing the memory contents in the event of a power failure. The NVDIMM can thus leverage the speed of the memory channel 110 and of memory accesses.

The EBB facility 112 can be a hardware facility that generates event-based exceptions when predefined events occur during the execution of one of the executables 118. An exception can be an interruption to an operation of a currently executing program. Following an EBB exception, the EBB facility 112 can invoke an event handler and, upon completion of the event handler, return control to the next instruction in the currently executing program.

The event handler can be a predefined routine or operation that is associated with the predefined event. For example, the EBB facility 112 includes an NVDIMM mapper 120. The NVDIMM mapper 120 can be an event handler that performs the read and write operations for the executable 118. Reads and writes are also referred to herein as loads and stores, respectively. According to embodiments of the present disclosure, when the executable 118 attempts to load, or store, dynamic program data from, or to, the volatile memory 106, the NVDIMM mapper 120 can load, or store, the dynamic program data from, or to, the NVDIMM 108. According to embodiments of the present disclosure, the NVDIMM 108 includes an address table 116. The address table 116 can map the memory location, where the executable 118 is attempting to perform the load or store, to a memory location in the NVDIMM 108.

The EBB facility 112 can include several registers. A register can be a dedicated hardware location that is configured for predetermined functionality. For example, the EBB facility 112 can include a branch event status and control register (BESCR) (not shown) and an event-based branch return register (EBBRR) (not shown). The BESCR can hold the address of the event handler that is invoked when an event-based exception is encountered. The EBBRR can hold an address where program control returns following the completion of the event handler. The EBRR can be populated automatically when the EBB facility 112 generates the event-based exception.

The loader 114 can be a part of an operating system (not shown) that loads the executables 118 into the volatile memory 106 and prepares the executables 118 for execution.

Preparing the executables 118 for execution can include defining the memory locations that the executable 118 uses for reading and writing program data. These memory locations can include addresses in the storage 104 and the volatile memory 106. The operating system can begin execution of the executables 118 once the loading is complete. As the processor 102 executes each instruction of the executable 118, the loader 114 can keep track of the address of the instruction in case of power loss or other system failure. Thus, if the operating system resumes execution of an executable 118 that failed due to power loss or other system failure, the loader 114 can reload the executable 118 into the volatile memory 106 and identify the instruction where execution is to resume. In this way, the operating system may resume execution of the executable 118.

Additionally, according to embodiments of the present disclosure, the loader 114 can identify predefined events to the EBB facility 112. More specifically, the loader 114 can specify that read and write operations are predefined events for the EBB facility 112. Further, the loader 114 can identify the NVDIMM mapper 120 as the event handler for the read and write events.

Figure 2:
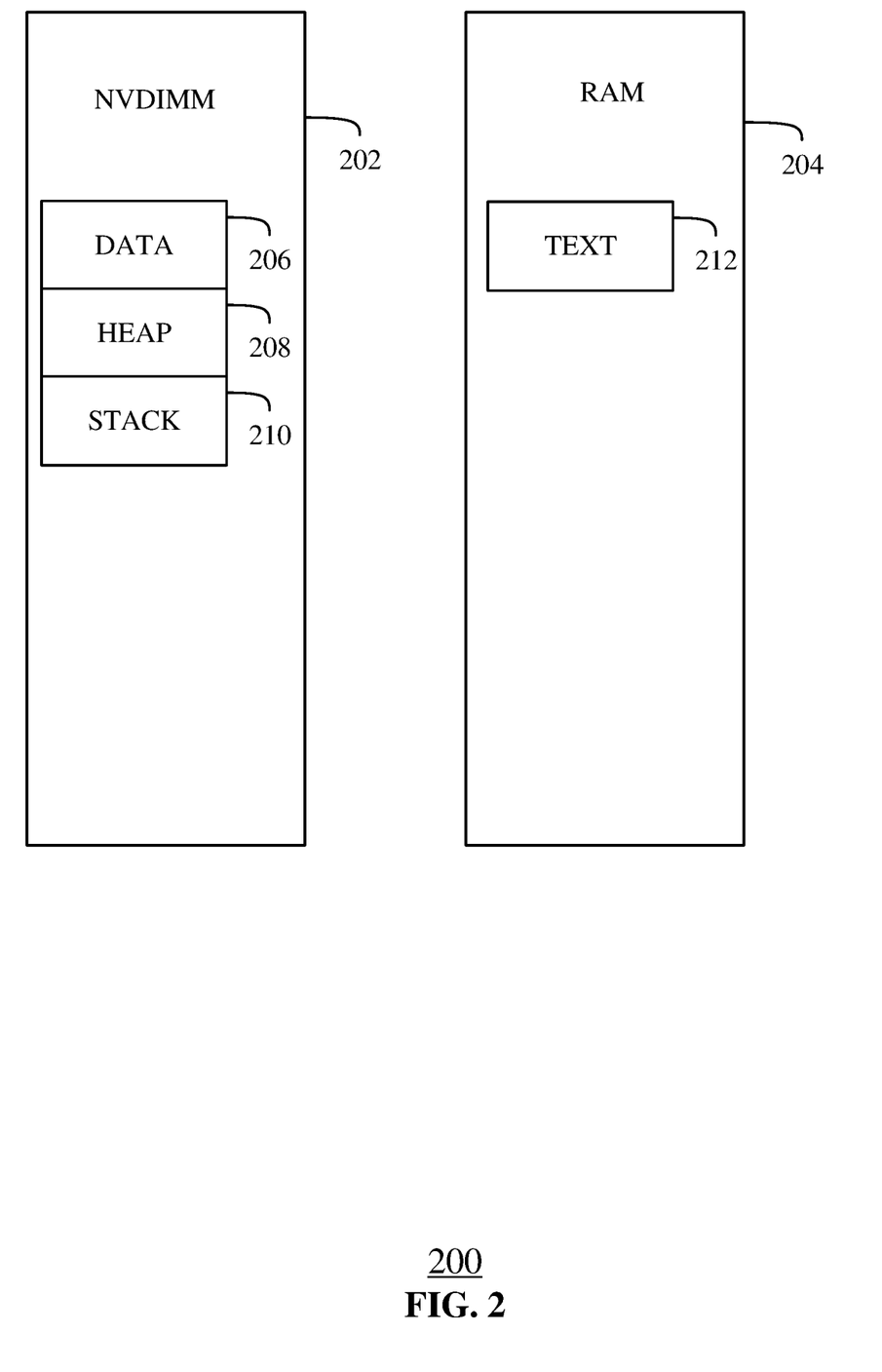
FIG. 2 illustrates a block diagram of a virtual memory area, in accordance with embodiments of the present disclosure.

Referring now to FIG. 2, illustrated is a block diagram of a virtual memory area 200, in accordance with embodiments of the present disclosure. The virtual memory area 200 can be a virtualized memory space used by an executable, such as the executables 118 described with respect to FIG. 1. A virtualized memory space can be a representation of different regions of physical memory that appears as a contiguous address space to the executable 118. In this way, an individual executable's view of the virtual memory area 200 is as if the executable 118 has full access to the system's physical memory. According to embodiments of the present disclosure, the virtual memory area 200 includes an NVDIMM 202 and a RAM 204. The NVDIMM 202 can be similar to the NVDIMM 108 described with respect to FIG. 1.

The NVDIMM 202 includes data 206, heap 208, and stack 210. The data 206 is a section of the virtual memory area 200 that includes the initialized global variables of an executable, such as the executables 118 described with respect to FIG. 1. The heap 208 is a section of the virtual memory area 200 that includes dynamically allocated objects. Dynamically allocated objects can be data items that are only used once by the executable 118.

The stack 210 is a section of the virtual memory area 200 that is local to a function performed by the executable 118. Stack frames are destroyed once a function returns.

The RAM 204 is an example of volatile memory, such as the volatile memory 106 described with respect to FIG. 1. The RAM 204 includes text 212. The text 212 can be a section of the virtual memory area 200 that contains a memory map of the executable 118. Because the loader 114 loads the executable into the RAM 204, instead of the NVDIMM 202, execution of the executables 118 in embodiments of the present disclosure can provide a cost savings over current systems for reducing unrecoverable errors.

Figure 3:
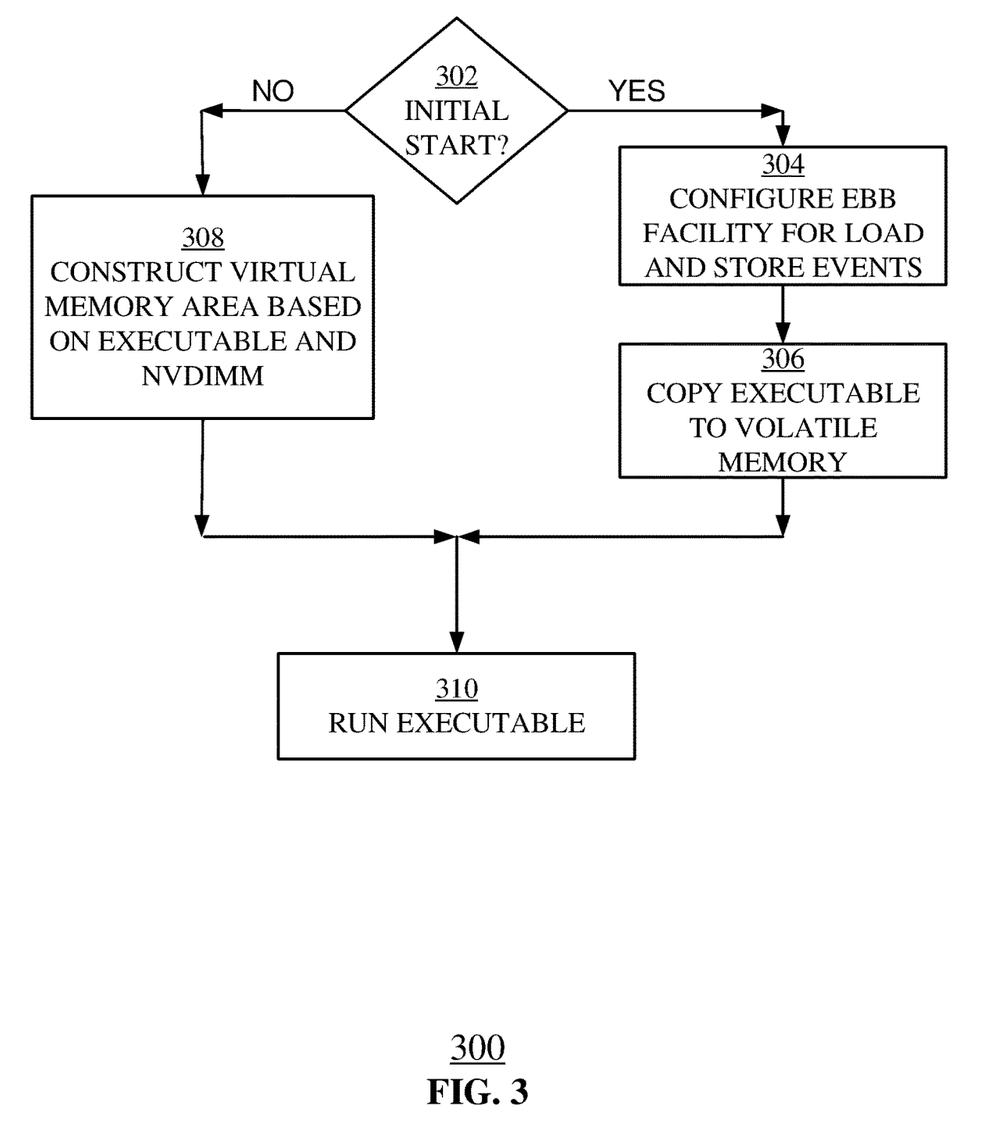
FIG. 3 illustrates a flowchart of an example method for NVDIMM storage, in accordance with embodiments of the present disclosure.

Referring now to FIG. 3, illustrated is a flowchart of an example method 300 for NVDIMM storage, in accordance with embodiments of the present disclosure. The method 300 can be performed by a loader, such as the loader 114, described with respect to FIG. 1. Referring back to FIG. 3, at block 302, the loader 114 can determine whether this is an initial start for the executable 118 to be run.

If this is an initial start for the executable 118, at block 304, the loader 114 can configure an EBB facility, such as the EBB facility 112 for load and store events. Configuring the EBB facility 112 can include defining loads and stores as predefined events for event-based branching during execution of the executable 118. Further, configuring the EBB facility 112 can include defining an NVDIMM mapper, such as the NVDIMM mapper 120, as the event handler for load and store events.

At block 306, the loader 114 can copy the executable 118 to volatile memory, such as the volatile memory 106 described with respect to FIG. 1. Copying the executable 118 can include reading the executable 118 from storage, such as the storage 104 described with respect to FIG. 1. Additionally, copying can include creating a copy of the executable 118 in the volatile memory 106.

If the loader 114 determines that this execution of the executable 118 is not an initial start, at block 308, the loader 114 can construct a virtual memory area, such as the virtual memory area 200 described with respect to FIG. 2 based on the executable 118 and the NVDIMM 108. The execution of the executable 118 is not an initial start if the loader 114 is resuming execution after a power loss, for example.

At block 310, the operating system may run the executable 118. Once the loader has completed preparing the executable 118 for execution, either by copying the executable at block 306 or constructing the virtual memory at block 308, the executable 118 is ready for execution. The executable 118 runs until a load or store event occurs, at which time, the EBB facility 112 can run the NVDIMM mapper 120.

Figure 4A:
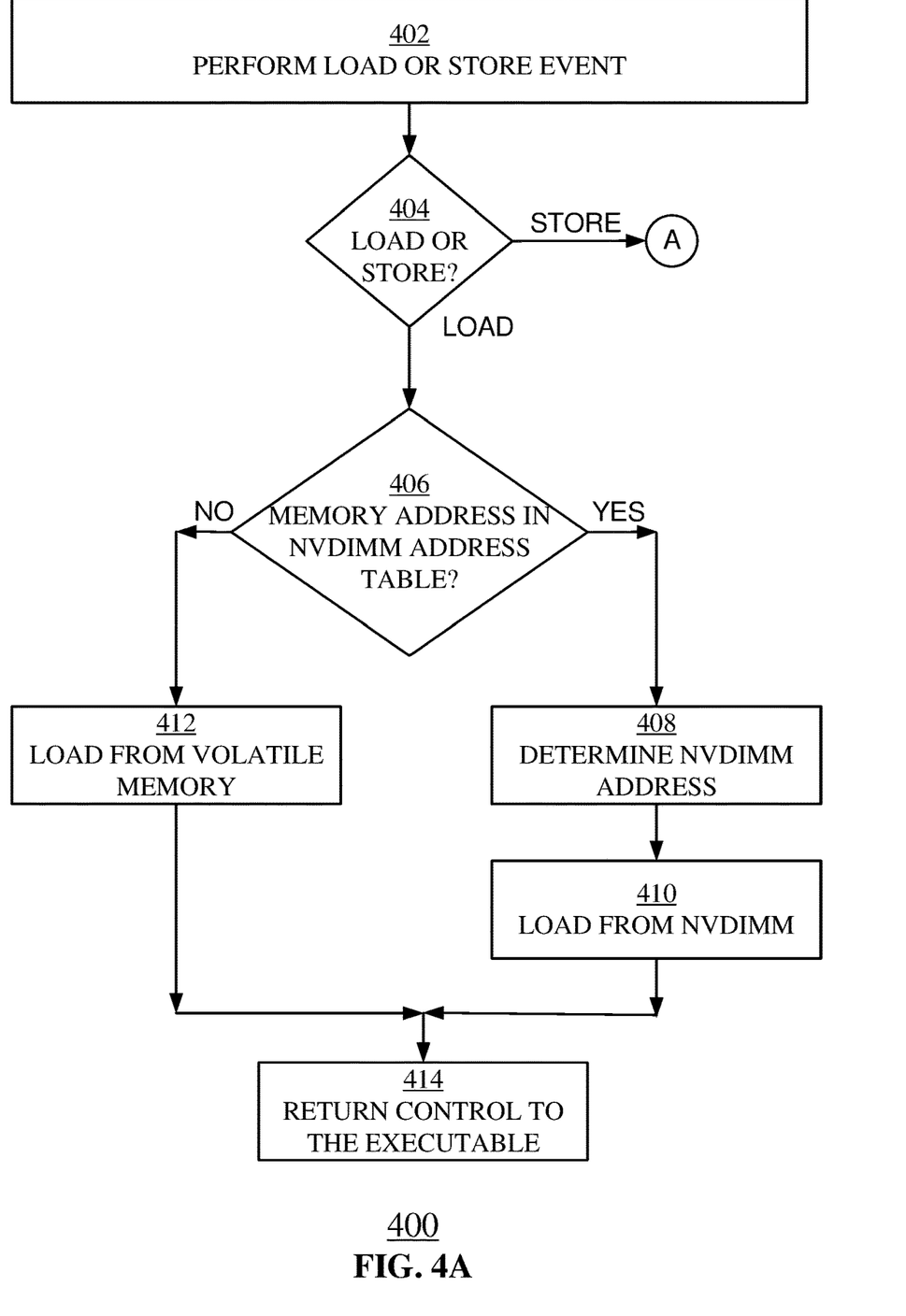
FIG. 4A illustrates a flowchart of an example method for NVDIMM storage, in accordance with embodiments of the present disclosure.

Referring now to FIG. 4A, illustrated is a flowchart of an example method 400 for NVDIMM storage, in accordance with embodiments of the present disclosure. The method 400 can be performed by the executable 118, along with a loader and an NVDIMM mapper, such as the loader 114 and NVDIMM mapper 120, described with respect to FIG. 1. At block 402, the executable 118 can perform a load or store event. Performing the load or store event can trigger the EBB facility 112 to run the NVDIMM mapper 120.

At block 404, the NVDIMM mapper 120 can determine whether the event is a load or a store. If the event is a load, the method 400 can flow to block 406.

At block 406, the NVDIMM mapper 120 can determine whether the memory address being loaded is in an NVDIMM address table, such as the NVDIMM address table 116 described with respect to FIG. 1. If the memory address being loaded is in the NVDIMM address table 116, the method 400 can flow to block 408.

At block 408, the NVDIMM mapper 120 can determine the NVDIMM address for the load. The NVDIMM address for the load is the memory address in the NVDIMM 108 where the data to be loaded is stored.

At block 410, the NVDIMM mapper 120 can load the data from the NVDIMM based on the determined NVDIMM address. In other words, the NVDIMM mapper 120 can read the data at the memory location specified in the NVDIMM address table 116. From block 410, the method 400 can flow to block 414.

If, at block 406, the NVDIMM mapper 120 determines that the memory address is not in the NVDIMM address table, the method 400 can flow to block 412. If the memory address is not in the NVDIMM address table, the data to be loaded is in the volatile memory. Accordingly, at block 412, the NVDIMM mapper 120 can load the contents from the memory address in the volatile memory.

At block 414, the NVDIMM mapper 120 can return control to the executable 118. As stated previously, when an event is triggered, the EBB facility 112 can store the address of the instruction of the executable 118 that is being executed. Accordingly, at block 414, control can return to this instruction.

If, at block 404, the NVDIMM mapper 120 determines that the event is a store, the method 400 can flow to placeholder A. The blocks associated with placeholder A are described with respect to FIG. 4B.

Figure 4B:
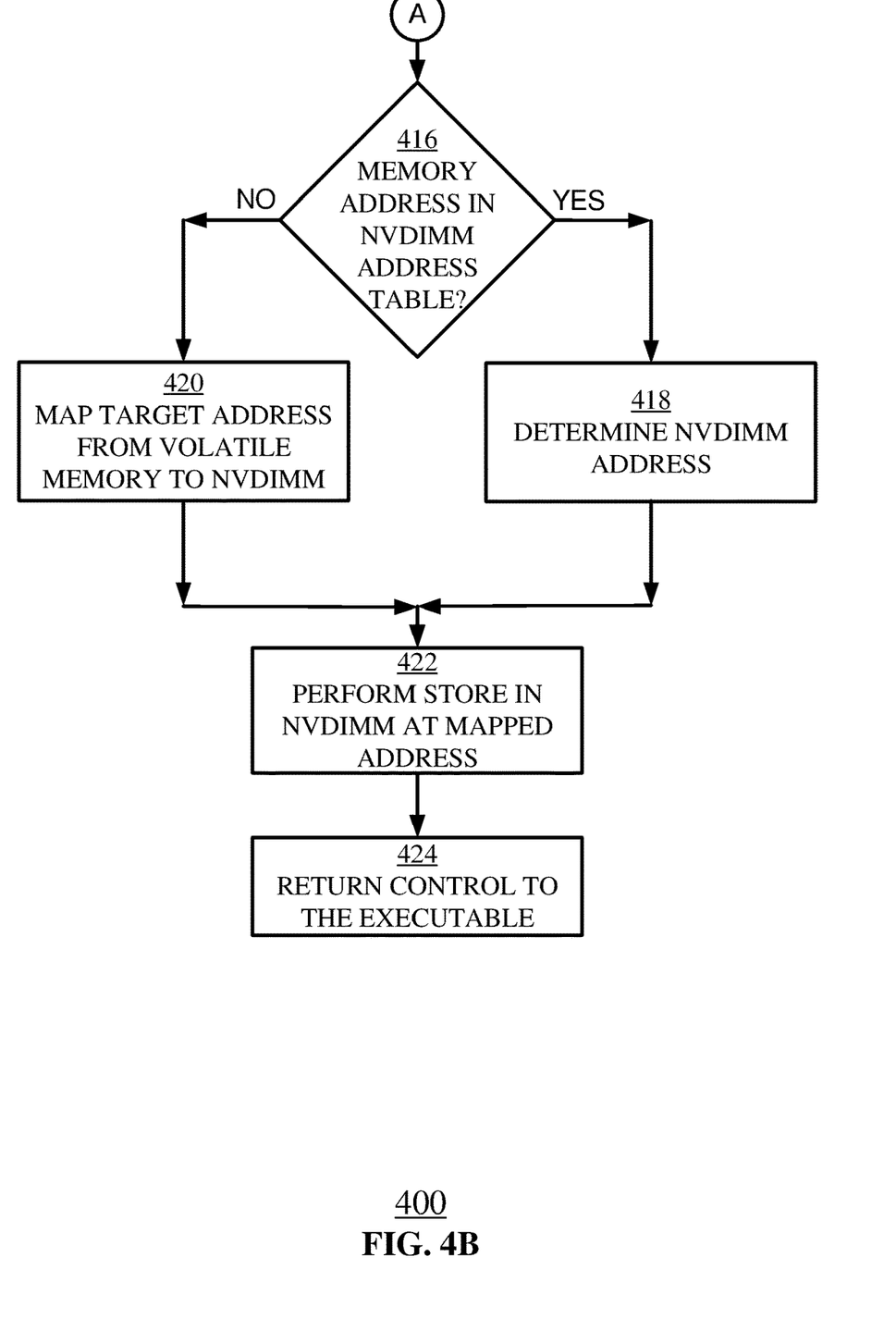
FIG. 4B illustrates a flowchart of an example method for NVDIMM storage, in accordance with embodiments of the present disclosure.

Referring now to FIG. 4B, illustrated is a flowchart of an example method 400 for NVDIMM storage, in accordance with embodiments of the present disclosure. At block 416, the NVDIMM mapper 120 can determine whether the memory address where the store is to take place is in the NVDIMM address table 116.

If the memory address where the store is to take place is in the NVDIMM address table 116, at block 418, the NVDIMM mapper 120 can determine the NVDIMM address for the store. The NVDIMM address for the store can be the mapped memory location in the NVDIMM 108 for the requested memory location.

If the memory address where the store is to take place is not in the NVDIMM address table 116, at block 420, the NVDIMM mapper 120 can map the target address of the store operation from the volatile memory 106 to the NVDIMM 108. Mapping the target address can include determining an available memory location in the NVDIMM 108 and updating the NVDIMM address table 116 with a mapping between the target address of the volatile memory 106 and the determined memory location in the NVDIMM.

At block 422, the NVDIMM mapper 120 can perform the store operation in the NVDIMM 108 at the mapped address. Because the mapped address is stored in the NVDIMM address table 116, future loads at the mapped address can successfully retrieve the correct data.

At block 424, the NVDIMM mapper 120 can return control to the executable 118. As stated previously, when an event is triggered, the EBB facility 112 can store the address of the instruction of the executable 118 that is being executed. Accordingly, at block 424, control can return to this instruction.

Figure 5:
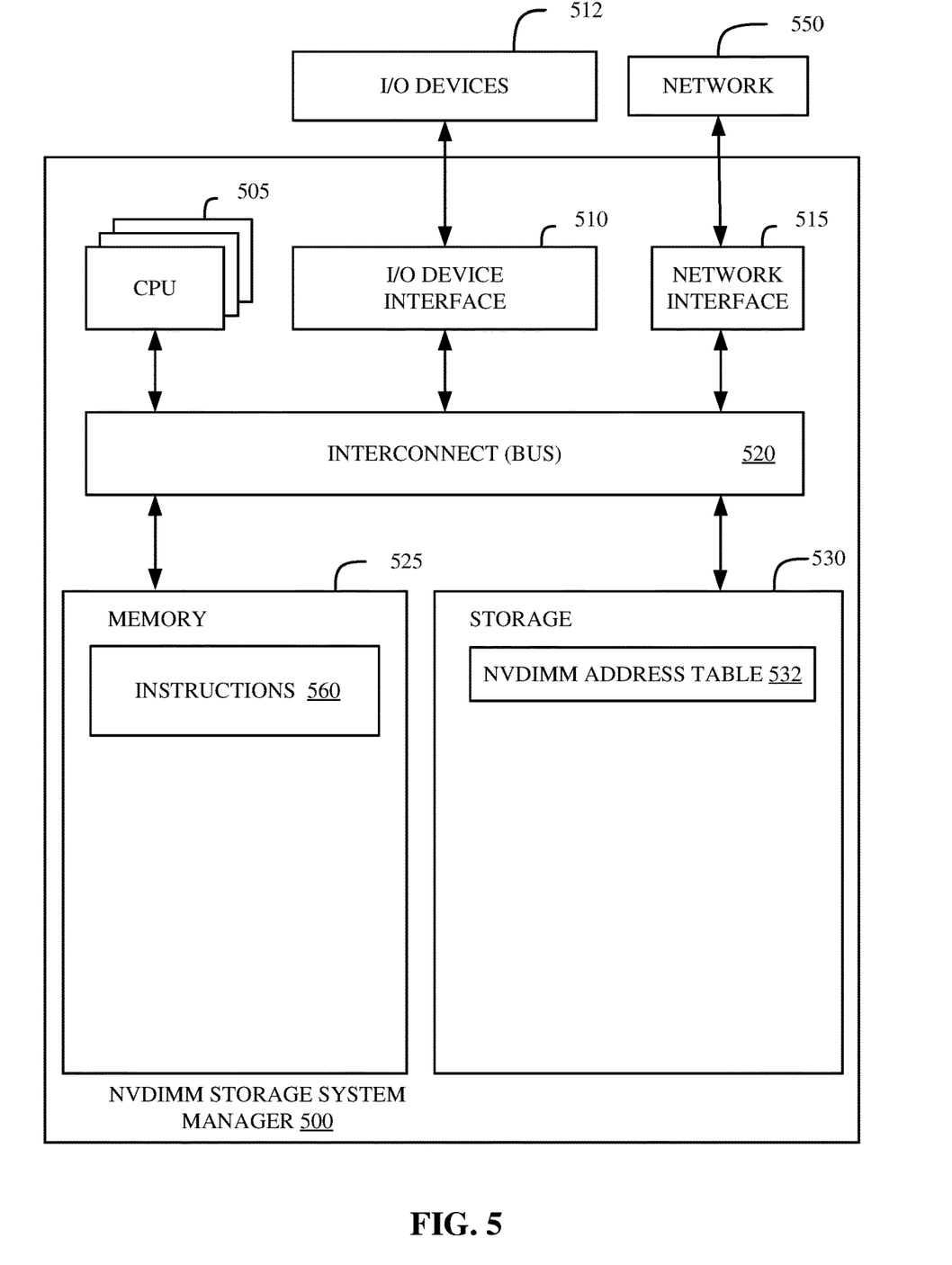
FIG. 5 illustrates a block diagram of an example NVDIMM storage manager, in accordance with embodiments of the present disclosure.

Referring now to FIG. 5, illustrated is a block diagram of an example NVDIMM storage system manager 500, in accordance with embodiments of the present disclosure. In various embodiments, the NVDIMM storage system manager 500 can perform the functionality discussed in FIGS. 1-4B. In some embodiments, the NVDIMM storage system manager 500 provides instructions for the aforementioned methods and/or functionalities to a client machine such that the client machine executes the method, or a portion of the method, based on the instructions provided by the NVDIMM storage system manager 500. In some embodiments, the NVDIMM storage system manager 500 comprises software executing on hardware incorporated into a plurality of devices.

The NVDIMM storage system manager 500 includes a memory 525, storage 530, an interconnect (e.g., BUS) 520, one or more CPUs 505 (also referred to as processors herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the NVDIMM storage system manager 500 via the I/O device interface 510 or a network 550 via the network interface 515.

In some embodiments, the memory 525 stores instructions 560 and the storage 530 stores an NVDIMM address table 532. However, in various embodiments, the instructions 560 and NVDIMM address table 532 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the functionality discussed in FIGS. 1-4B. The NVDIMM address table 532 may include mappings between memory locations in a volatile memory and an NVDIMM, such as the volatile memory 106 and NVDIMM 108 described with respect to FIG. 1.

In various embodiments, the I/O devices 512 include an interface capable of presenting information and receiving input. For example, I/O devices 512 can present information to a user interacting with NVDIMM storage system manager 500 and receive input from the user.

NVDIMM storage system manager 500 is connected to the network 550 via the network interface 515. Network 550 can comprise a physical, wireless, cellular, or different network.

In some embodiments, the NVDIMM storage system manager 500 can be a multi-user mainframe computer system, a single-user system, or a server computer or similar device that has little or no direct user interface but receives requests from other computer systems (clients). Further, in some embodiments, the NVDIMM storage system manager 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary NVDIMM storage system manager 500. In some embodiments, however, individual components can have greater or lesser complexity than as represented in FIG. 5, components other than or in addition to those shown in FIG. 5 can be present, and the number, type, and configuration of such components can vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
    loading an executable to a volatile random access memory;
    in response to a store operation attempted by the executable, determining that a target address of the store operation is not mapped from an address in the random access memory to an address in a non-volatile dual in-line memory module (NVDIMM);
    mapping the target address from the address in the volatile random access memory to the address in the NVDIMM;
    performing the store operation in the address in the NVDIMM based on the mapping; and configuring an event-based branching facility to trigger an event handler to perform the method in response to one selected from a group consisting of: the store operation, and a load operation.

2. The method of claim 1, further comprising configuring the event-based branching facility to return program control to an instruction of the executable that is associated with the store operation upon completion of the store operation.

3. The method of claim 1, further comprising tracking a program counter that identifies an instruction that is being executed.

4. The method of claim 3, further comprising:
re-constructing a virtual memory area based on the executable and the mapping; and
resuming an execution of the executable after a power loss to the NVDIMM by returning program control to the instruction.

5. The method of claim 1, further comprising:
in response to a load operation attempted by the executable, determining that the target address of the store operation is mapped from an additional address in the random access memory to an additional address in the NVDIMM; and
performing the load operation at the additional address in the NVDIMM based on the mapping.

6. The method of claim 1, further comprising:
in response to a load operation attempted by the executable, determining that a target address of the store operation is not mapped from an additional address in the random access memory to an additional address in the NVDIMM; and
performing the load operation at the additional address in the random access memory.

7. A computer program product comprising program instructions stored on a computer readable storage medium, wherein the computer readable storage medium is not a transitory signal per se, the program instructions executable by a processor to cause the processor to perform a method comprising:
loading an executable to a volatile random access memory;
in response to a store operation attempted by the executable, determining that a target address of the store operation is mapped from an address in the random access memory to an address in a non-volatile dual in-line memory module (NVDIMM);
determining a mapping from the target address to the address in the NVDIMM;
performing the store operation in the address in the NVDIMM based on the mapping; and
configuring an event-based branching facility to trigger an event handler to perform the method in response to one selected from a group consisting of: the store operation, and a load operation.

8. The computer program product of claim 7, the method further comprising configuring the event-based branching facility to return program control to an instruction of the executable that is associated with the store operation upon completion of the store operation.

9. The computer program product of claim 7, the method further comprising tracking a program counter that identifies an instruction that is being executed.

10. The computer program product of claim 7, the method further comprising:
re-constructing a virtual memory area based on the executable and the mapping; and
resuming an execution of the executable after a power loss to the NVDIMM by returning program control to the instruction.

11. The computer program product of claim 7, the method further comprising:
in response to a load operation attempted by the executable, determining that the target address of the store operation is mapped from an additional address in the random access memory to an additional address in the NVDIMM; and
performing the load operation at the additional address in the NVDIMM based on the mapping.

12. The computer program product of claim 7, the method further comprising:
in response to a load operation attempted by the executable, determining that a target address of the store operation is not mapped from an additional address in the random access memory to an additional address in the NVDIMM; and
performing the load operation at the additional address in the random access memory.

13. A system comprising:
a computer processing circuit; and
a computer-readable storage medium storing instructions, which, when executed by the computer processing circuit, are configured to cause the computer processing circuit to perform a method comprising:
loading an executable to a volatile random access memory;
in response to a store operation attempted by the executable, determining that a target address of the store operation is mapped from an address in the random access memory to an address in a non-volatile dual in-line memory module (NVDIMM);
determining a mapping from the target address to the address in the NVDIMM; and
performing the store operation in the address in the NVDIMM based on the mapping; and
configuring an event-based branching facility to trigger an event handler to perform the method in response to one selected from a group consisting of: the store operation, and a load operation.

14. The system of claim 13, the method further comprising configuring the event-based branching facility to return program control to an instruction of the executable that is associated with the store operation upon completion of the store operation.

15. The system of claim 13, the method further comprising tracking a program counter that identifies an instruction that is being executed.

16. The system of claim 13, the method further comprising:
re-constructing a virtual memory area based on the executable and the mapping; and
resuming an execution of the executable after a power loss to the NVDIMM by returning program control to the instruction.

17. The system of claim 13, the method further comprising:
in response to a load operation attempted by the executable, determining that the target address of the store operation is mapped from an additional address in the random access memory to an additional address in the NVDIMM; and performing the load operation at the additional address in the NVDIMM based on the mapping.

\* \* \* \* \*